United States Patent [19]
Keyes

[11] Patent Number: 5,845,017
[45] Date of Patent: Dec. 1, 1998

[54] DIGITAL IMAGE PROCESSING METHOD FOR DEGRAINING OF FILM IMAGES USING DISTANCE WEIGHTED AVERAGING OF TARGET PIXEL CODE VALUES

[75] Inventor: Michael P. Keyes, Fairport, N.Y.

[73] Assignee: Eastman Kodak Company, Rochester, N.Y.

[21] Appl. No.: 767,902

[22] Filed: Dec. 17, 1996

[51] Int. Cl.$^6$ .............................. G06K 9/40; G06T 5/00; H04N 1/409

[52] U.S. Cl. ........................ 382/261; 382/264; 382/275; 358/463

[58] Field of Search ................................... 382/261, 264, 382/262, 260, 275, 274, 254, 205; 358/463, 447

[56] References Cited

U.S. PATENT DOCUMENTS

| | | | |
|---|---|---|---|
| 4,731,865 | 3/1988 | Sievenpiper | 382/274 |
| 4,833,723 | 5/1989 | Loveridge et al. | 382/264 |
| 5,031,227 | 7/1991 | Raasch et al. | 382/205 |
| 5,091,972 | 2/1992 | Kwon et al. . | |
| 5,452,376 | 9/1995 | Ramirez et al. | 382/274 |
| 5,533,149 | 7/1996 | Kaplan et al. | 382/260 |
| 5,563,963 | 10/1996 | Kaplan et al. | 382/266 |
| 5,594,816 | 1/1997 | Kaplan et al. | 382/275 |

OTHER PUBLICATIONS

Jong–Sen Lee, *Digital Image Smoothing and the Sigma Filter*; 1983, Computer Vision, Graaphics, and Image Processing 24, pp. 255–269.

L.S. Davis and Azriel Rosenfeld, *Noise Cleaning by Iterated Local Averaging*; IEEE Transactions on Systems, Man, and Cybernetics, vol. SMC–8, No. 9, Sep. 1978; pp. 705–710.

K.A. Narayanan and Azriel Rosenfield, *Image Smoothing by Local Use of Global Information*; IEEE Transactions on Systems, Man, and Cybernetics, vol. SMC–11, No. 12, Dec. 1981; pp. 826–831.

Ann Scher, Flavio R. Dias Velasco, and Azriel Rosenfield, *Some New Image Smoothing Techniques*; IEEE Transactions on Systems, Man, and Cybernetics, vol. SMC–10, No. 3, Mar. 1980; pp. 153–158.

*Primary Examiner*—Scott Rogers
*Attorney, Agent, or Firm*—Francis H. Boos, Jr.

[57] ABSTRACT

A method of digital image processing for degraining (smoothing) of images based on selected averaging of pixels in a neighborhood of pixels surrounding a target pixel to be recalculated. Improvement in the application of the selected average method to images of higher graininess such as might be obtained from higher speed films is achieved by weighting the difference in code values between each neighborhood pixel and the target pixel in accordance with a function that is related to physical distance between the neighborhood pixel and the target pixel. After all target pixels are recalculated using a selected fraction of pixel elements based on their distance weighted difference values, the process is iterated for each target pixel "n" number of times to achieve a desired relative code value of the target pixel to surrounding background pixel code values whereupon a final unweighted averaging operation is performed to achieve the final recalculated value of the target pixel.

10 Claims, 4 Drawing Sheets

DIGITAL IMAGE PROCESSING METHOD FOR DEGRAINING OF FILM IMAGES USING DISTANCE WEIGHTED AVERAGING OF TARGET PIXEL CODE VALUES

FIELD OF THE INVENTION

The invention relates generally to the field of digital image processing. More specifically, the invention relates to a method for reducing granularity noise in digital images derived from photographic film images. Such a method is referred to herein as "degraining".

BACKGROUND OF THE INVENTION

In digital image processing, degraining algorithms are well known which average sets of pixel code values in each color channel to reduce the color density variation. This is variously referred to as "smoothing" or "blurring". The sharpness of the images degrades as a result.

One known degraining technique which performs a smoothing function while attempting to preserve sharpness is found in commonly assigned U.S. Pat. Nos. 5,091,972, 5,533,149, and 5,563,963. In these disclosures, algorithms are used to discriminate edges, defined as significant variation in code values of adjacent images pixels, and then assign specialized weighting factors to reduce the effects of the algorithms in the edge region. While highly effective, these algorithms are highly complex and require excessive computational time that make them impractical for commercial applications. Additionally, when applied to images derived from higher speed, more grainy films, larger variations occur in the pixel density code values which make it more difficult to discriminate the edge regions which adds to the complexity and computation time.

Another known degraining technique that attempts to preserve sharpness may be referred to as "adaptive image processing". Examples of such technique are found in U.S. Pat. Nos. 5,442,462 and 5,452,376. In general, these disclosures employ algorithms to discriminate edge regions ("neighborhoods") and then select one of several specific functions to apply to that neighborhood. These techniques, while effective, also require excessive computational power and time that make them impractical for commercial application in, for example, motion picture film digital image processing.

To reduce the computational time and complexity in performing image smoothing, an alternative method of selectively averaging pixels in neighborhood of a target pixel has been employed. Such a technique is described in the article "Noise Cleaning by Iterated Local Averaging" Davis et al. IEEE Transactions on Systems, Man and Cybernetics, Vol. SMC-8, No. 9, September, 1978. With this technique, the selection of the pixels to be included in the smoothing calculations is based on gray scale differences between neighborhood pixels and the target pixel with neighborhood pixels representing smaller differences being selected. An advantage of this technique is that it does not have the complex, time consuming computational requirements of the above described techniques. It is highly effective at reducing granularity in images derived from slow speed, fine grain films; however, this technique fails for high speed, coarser grained films and, particularly, in the edge regions of images of coarser grained films. There is therefore a need for a degraining method that is computationally efficient and is equally effective for processing of images from both fine and coarse grain films.

SUMMARY OF THE INVENTION

In accordance with the invention therefore there is provided an improved method of degraining a digital image by means of a selected average technique in which code values of selected pixels are averaged to obtain an average code value and the average code value is assigned to the target pixel. The selected pixels that lie in a neighborhood of pixels surrounding a target pixel and which are rank ordered by differences in code values between the neighborhood pixels and the target pixel. In a principal aspect of the invention, the improvement comprises the step of weighting the difference code values as a function of distance of each neighborhood pixel from the target pixel before rank ordering the resultant distance weighted difference code values. In a second aspect of the invention, the distance weighted average code value is calculated and assigned for a target pixel in each of a plurality of neighborhoods in an image after which the process is iterated for all of the target pixels to establish successive recalculated code values for the target pixels. In images that have edge content where retention of sharpness after degraining is of concern, the neighborhoods of pixels include background and edge pixel elements having significantly different code values. Preferably, the process iterations are continued until substantially all the recalculated and assigned target pixel code values of the plurality of neighborhoods are closer to code values of the background pixel elements than the code values of the edge pixel elements. Once this point is reached, a final iteration is applied to the target pixels in the recalculated target pixel values are based on the use of selected unweighted neighborhood pixel code values to calculate the final average pixel values to be assigned to the target pixels.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 4 is a pixel neighborhood diagram for an example of a target pixel close to a straight edge.

FIG. 5 is a pixel neighborhood diagram for an example of a target pixel close to a diagonal straight edge.

FIG. 6 is a pixel neighborhood diagram for an example of a target pixel close to a grid pattern edge.

FIG. 7 is a pixel neighborhood diagram for an example of a target pixel close to a corner edge.

DETAILED DESCRIPTION OF THE INVENTION

Figure 1:
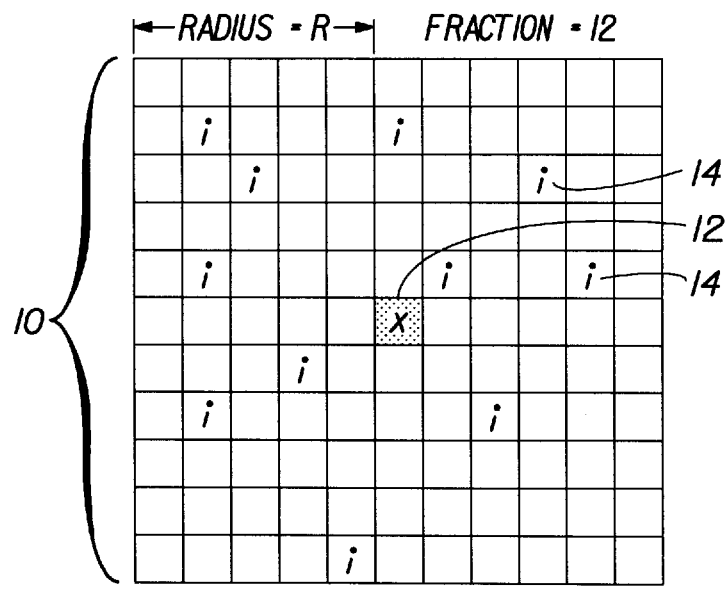
FIG. 1 is a diagram illustrating a neighborhood of pixel elements surrounding a target pixel code value of which is to be recalculated in accordance with the invention.

It is helpful in understanding the present invention to first consider in some detail the operation of the selective averages method of degraining as mentioned above. In FIG. 1, a target pixel is surrounded by a neighborhood of pixels defined by a "radius" parameter, R, which can have integral values varying, for example, from 0 to 20. This defines the radius of pixels used for calculating new density code values in each of three color channels, red, green and blue, for the target pixel. In the example of FIG. 1, the radius equals 5. In the selective averaging method, a second parameter, the "fraction", which can vary from 0 to 1, is employed to define the fraction of the neighborhood pixels to be used in calculating the average code values for each color channel for the target pixel. For convenience, the ensuing description will deal with calculations for only a single channel although it will be appreciated that the calculations are replicated for each of the three channels.

In general, the selective averages method first creates a histogram of all the neighborhood pixels based on their code values and then calculates an average code value using only a selected fraction of pixels having code values which are closest to the code value of the target pixel. It is convenient to represent this process by means of a one dimensional array (1) as shown below in which each element of the array is a code value for a pixel in the group. The code values of the pixel elements in the neighborhood are rank ordered left to right in order of increasing absolute difference in code values between each pixel element and the target pixel. Rank ordering the pixel elements in the array by their absolute differences in code values from the target code value allows the convenient selection of a threshold difference value which relates to a fraction, represented by the symbol, "/" in the array, of the pixel elements having "near code values" that will be used to calculate the average code value to be assigned to the target pixel "x".

$$[x,i,i,i,i,i,i,i,i,i,i,/\_,\_,\_,\ldots \_,\_] \tag{1}$$

Thus, in FIG. 1, the eleven pixels labeled "i" correspond to a fraction (0.1) which, along with the target pixel, x, represent the 10% of the total neighborhood of 121 pixels that are the closest in code value to that of the target pixel.

The selected fraction is a user determined variable that is dependent on image content. More specifically, it is dependent on the types of edges that appear in the image. As an entire image is degrained, each pixel in the image becomes, in turn, a target pixel, and its code value is re-calculated. When the code value of the target pixel is one that represents a grain spot, i.e. a significant difference from the expected background code value, the target pixel code value, is averaged to the background code values represented by the "near value" pixels determined by the selected fraction. This works quite well when the neighborhood pixels lie entirely in a background portion of the image that is not near an edge. However, when the target pixel is near an edge, the target pixel code value is averaged with both background and any edge code values that fall within the selected fraction.

The selected averages algorithm relies on judicious choice of the fraction parameter to minimize the effect on edges. Ideally, a fraction is chosen which separates edge code values from background code values while effectively averaging the grain spot code values to the background. In the pixel array for each target pixel, as many pixels as possible representing edges should occur after the "/" separator, and as many pixels as possible representing the background should appear before the "/" separator. For any given type of edge structure, there is an upper limit for the fraction, above which the sharpness of the edge is lost. Successful degraining must occur with a fraction below that limit. As will be seen in examples presented below, the maximum acceptable fraction value, to the nearest tenth, for a straight edge is 0.5 and for a 90° corner edge is 0.2. It will be appreciated that finer increments of the fraction value may be employed, e.g. hundredths, which may give further improvement in the degraining results while retaining a desired degree of sharpness.

Figure 2:
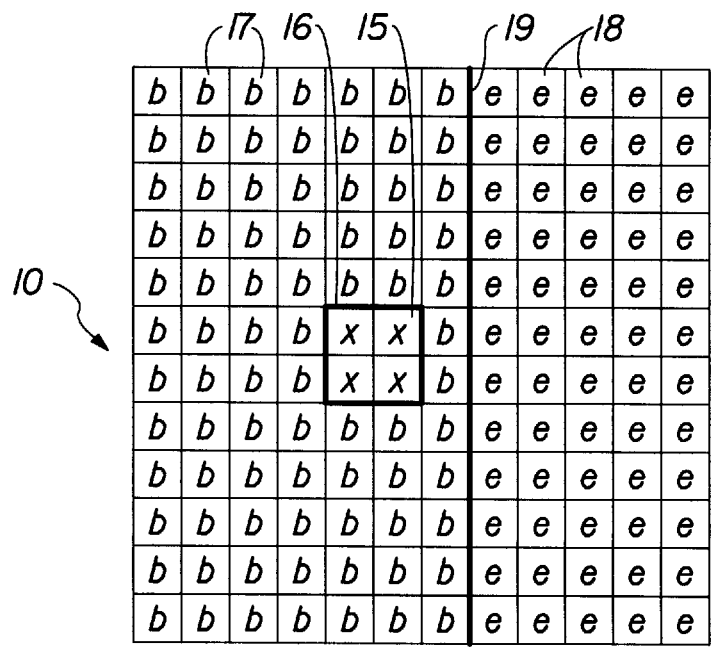
FIG. 2 is a diagram illustrating a neighborhood of pixel elements in which a target pixel is close to an edge.

To better understand the present invention to be described hereinafter, it may be helpful to first consider in more detail the operation of the selected averages algorithm in the presence of edges in the image being degrained in which the relative magnitudes of the code values of the pixels for the grain spot, background and edge are taken into account. In FIG. 2, there is depicted a neighborhood of 144 pixels comprising a grain spot of four pixels having a code value, x, on a background having a code value, b, and lying near an edge having a code value, e. In most cases, the difference in code values between the grain spot and the background is either less than or greater than the difference in code values between the grain spot and the edge. The situation can exist in which they are equal but this is statistically less significant than the other two situations. In absolute values notation, the "less than" and "greater than" situations are represented by the following expressions (2) and (3), respectively.

$$|x-b|<|x-e| \tag{2}$$

$$|x-b|>|x-e| \tag{3}$$

Array (4), below, represents the pixel neighborhood array of FIG. 2 in which a target pixel 15 is one of four pixels having a code value "x" which makes up a grain spot 16 lying among background pixels 17. The radius of the neighbor 10 surround target pixel 15 is large enough to include some of edge pixels 18 on the opposite side of edge line 19. Array (4) shows the order of all pixels within the neighborhood when $|x-b|<|x-e|$, i.e. the grain spot code value is closer to the background than the edge. Ideally, an appropriate value for the fraction can be chosen which excludes the pixels for the edge and includes only some or all the pixels for the background. It is apparent from this array that a maximum fraction can be set that will always meet this requirement. Therefore with such an appropriate fraction value, the grain pixel code values will be averaged only with the background code values, and the sharpness of the edge will be retained when recalculating the code values for pixels near the edge.

$$|x-b|<|x-e|: [x,x,x,x,b,b,b, \ldots b,/e,e,e, \ldots e] \tag{4}$$

When $|x-b|>|x-e|$, i.e. the grain spot code value is closer to the edge code value than the background, the order for the pixels in the pixel array is reversed as shown in array (5).

$$|x-b|>|x-e|: [x,x,x,x,e,e,e, \ldots e/b,b,b, \ldots b] \tag{5}$$

Since the objective in image degraining is to bring the recalculated grain spot value "x" closer to the background value "b", it becomes necessary in this instance to increase the fraction value to a value that includes a sufficient number of background pixels that will cause the averaging operation to achieve this effect. However, as noted above, there is a maximum fraction value for a given image content that can be employed in any degraining operation that will retain the desired degree of sharpness in the resultant image. Increasing the fraction value in the case of array (5) to achieve suitable degraining violates this limitation and thus results in undesirable loss of image sharpness.

Digital images that are derived from low speed, fine-grain films typically present conditions more like array (4) than array (5). Higher speed, courser-grain films result in digital images in which there is a larger granular variation in color density and, consequently, a larger variation in pixel code values. Hence, higher speed films result in images in which situations like array (5) occur more often than array (4). As a consequence, the selection of an appropriate fraction for differentiation between background and edge pixels in the case of images from high speed films becomes problematic making the selected averages algorithm ineffective for high speed films. The invention, therefore, is concerned with providing an improvement in the selected averages method of image processing in which image grain situations of the type represented by array (5) are satisfactorily addressed, preferably without any significant degradation in image processing performance achieved in the case of grain situations represented by array (4).

In accordance with a principal aspect of the invention, the difference code values of each pixel element in the neighborhood of pixels surrounding the target pixel are weighted as a function of the distance of each pixel element from the target pixel before rank ordering the weighted difference code values. This position sensitive calculation aspect of the invention orders the elements of the pixel array according to the difference between each pixel and the target pixel multiplied by a function of the distance that pixel is away from the target pixel. This allows neighborhood pixels physically closer to the target pixel to be weighted more heavily towards inclusion in recalculation of the target pixel code value as compared with pixels further away. The selection of the pixel element code values employed in the averaging used to determine the recalculated target pixel value is thus based on the distance weighted values of the pixel element difference values. As the distance for a neighborhood pixel decreases from the target pixel, the element representing that neighborhood pixel will more likely occur closer to the beginning of the pixel array, and thus more likely to be included in the calculation of the new code value for the target pixel.

In presently preferred embodiments of the invention, the difference code values "D" between the target pixel and the individual neighborhood pixels are multiplied by a distance related function. Examples of a suitable function for this purpose are shown in functions (6) and (7) although it will be apparent from the following discussion that other distance related functions may be employed:

$$(i+j)^P \qquad (6)$$

$$(i^P+j^P) \qquad (7)$$

In functions (6) and (7), the values, i and j, are the distances, normally given in integral pixel elements, between the specific neighborhood pixel and the target pixel in the x and y directions. The value "P" is a selectable exponential parameter. As the value of P increases, the code values for the pixels near to the target pixel would be increasingly likely to be used in the calculation. Note that when P=1.0, the two equations give equivalent results. In terms of the type of film images being degrained, with higher speed films and correspondingly increased graininess of the film image, higher values of "P" would be selected for better results. It will be appreciated that, in function (6) when P=0, the term $(i+j)^P$ equals 1. In this case, the difference code values are unweighted and the ordering for the pixel array would be equivalent to that obtained with the selected average algorithm.

The general effect on arrays (4) and (5) of employing a distance related function to perform weighted averaging of the pixel element difference values is to mix the background and edge code values, b and e, in the resultant recalculated array used in recalculating the target pixel value. The extent that the mixing would occur depends on the magnitudes of the differences in code values and the distances between each pixel and the target pixel. In any given film image frame, there will be a distribution of occurrences of array (4) and array (5) types of neighborhoods. With higher speed, more coarse films, the occurrence of array (5) neighborhoods increases. When the distance weighted averaging calculation is performed for each neighborhood in the image frame, the affect on array (5) neighborhoods is to move the recalculated values of the target pixels towards the desired "b" value in a more efficient manner than with unweighted averaging due to the mixing effect introduced by the distance weighting. However, this mixing effect on target pixels in array (4) neighborhoods also causes less efficient correction than if unweighted averaging were used. In accordance with a further aspect of the invention, it has been found that iterations of the distance weighted averaging will not only further improve the calculation of target pixel values for array (5) neighborhoods but will also improve the calculation of target pixels in array (4) neighborhoods in most cases. The overall effect is to realize an efficient degraining of film images with relatively high occurrences of array (5) neighborhoods without any significant degrading of the performance for array (4) neighborhoods.

In this further aspect of the invention, the foregoing position sensitive calculation is iterated by a user selectable number "n" of iterations, where the number "n" may be greater than or equal to one, followed by a final calculation employing the unweighted selected averages calculation, e.g. with the distance weighting function set to a value of "1". The number of iterations "n" is a user selected function which is based on the type of film involved and the type of image scenes being degrained. It is an empirically determined number determined by the user. In general, higher granularity films and scenes with a high number of corners will require higher values for "n". Employing the "n" number of iterations with the position sensitive calculation, it is possible to reduce a grain spot that has a larger difference between its code values and the background code values than with the edge code values, i.e. |x−b|>|x−e|, to the more desirable situation in which the code value differences have reversed order, i.e. |x−b|<|x−e|, such that the target grain spot pixel now has a code value closer to background than edge. The preferred number of iterations is essentially a subjective selection by the user that causes substantially all target pixels to reach code values of "x" satisfying the condition |x−b|<|x−e|. Once in this latter situation, one more iteration with the unweighted selected averages algorithm completes the degraining process. The end result is significantly improved over any number of iterations with just the selected averages algorithm as will be seen from the discussion of the operating examples.

Figure 3:
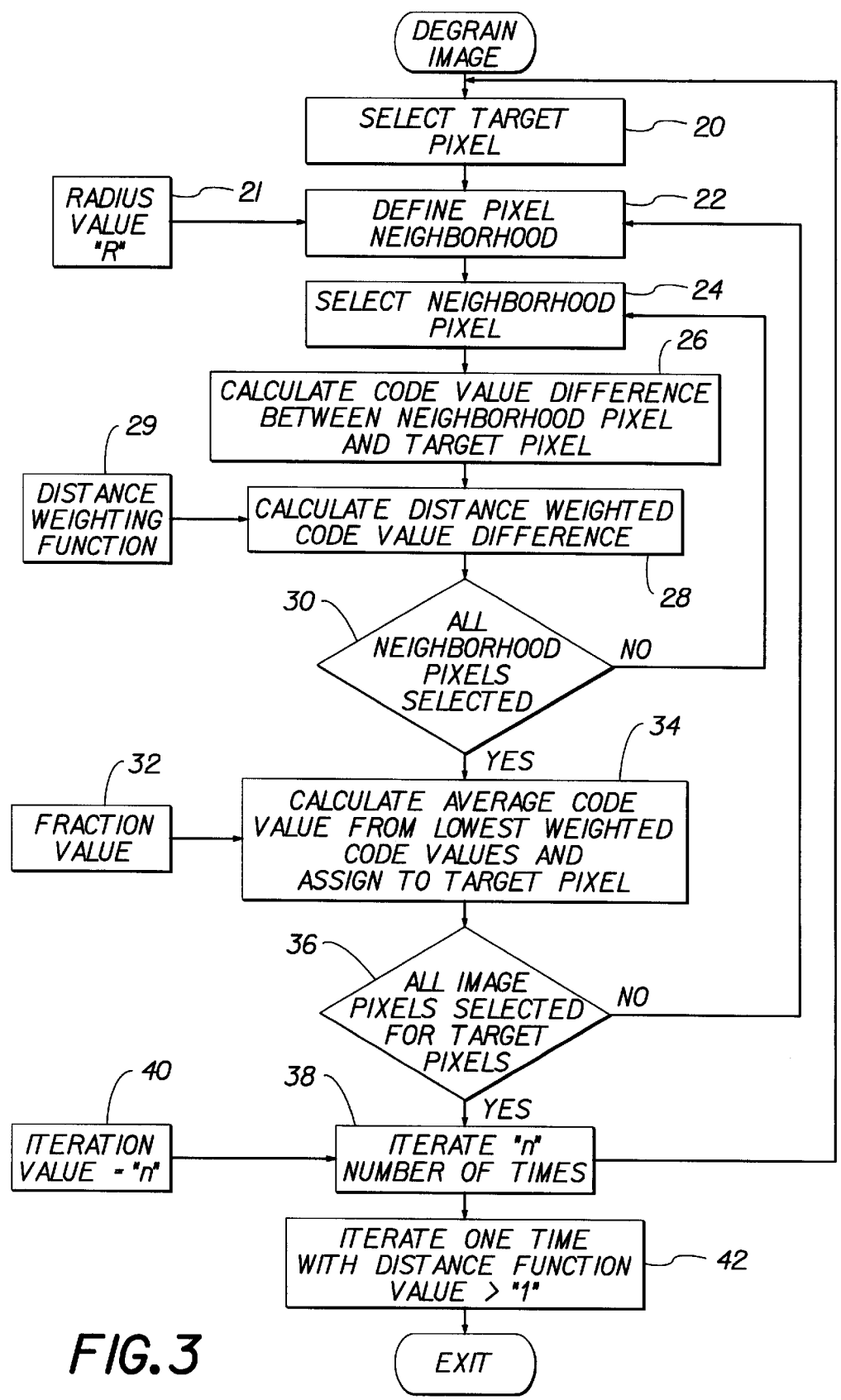
FIG. 3 is a flow diagram illustrating the operation of the present invention and which may be used to represent a patent program for implementing the method of the invention.

Referring now to FIG. 3, the operation of the method of the invention will be described in reference to the flow diagram shown therein. The degraining method is entered into after an image is chosen for degraining. Within that image, a target pixel is selected at step 20. A user-defined value for the radius "R" is input at 21 and, based on this value, a pixel neighborhood surrounding the target pixel is defined at step 22. A pixel within the neighborhood is selected at step 24 and the difference between the code value for that pixel and the target pixel code value is calculated at step 26. That difference value is multiplied at step 28 by a selected one of the distance functions described above which is input at step 29 and which represents the distance between the selected neighborhood pixel and the target pixel. This is called the weighted code value difference and is stored in memory for later use in calculating the selected average pixel value for the neighborhood. Step 30 determines if all neighborhood pixels have been selected and, if not, the flow returns to step 24 for selection of another neighborhood pixel. The process is repeated until the weighted code value difference for every neighborhood pixel is calculated.

Based on a user-defined fraction value, between 0 and 1, input at 32, the fraction of the neighborhood pixels whose weighted code value differences are the lowest in value are averaged at step 34 and the average is assigned as the code value for the target pixel. If step 36 determines that additional target pixel values are to be calculated, the flow returns to step 20 for repetition of the process until step 36 determines that all target pixels for the image have been selected and recalculated. Upon completion of the calculation of the target pixels for the first iteration, step 38 repeats the recalculation process for the image target pixels "n" times based on a value of "n" input at step 40. The image will be degrained "n" number of times, where n ≧ 1. The value n is determined by the user, and will be dependent on not only the scene content, but also the subjective level of degraining that the user desires. As described above, the selection of "n" is empirically driven based on film graininess and scene content. At the conclusion of the "n" number of recalculations using the distance weighting function, the image is degrained one time at step 42 with the distance function set equal to the value of "1".

There will now be considered comparative results of computer modeled operating examples used to illustrate the successful degraining of images in a variety of edge conditions. In the following operating examples, several common edge structures are modeled with an edge code value, e, while degraining a grain spot with code value, x, to a background code value, b. Various sets of code values demonstrating a representative range of situations demonstrated. Three values for the radius, R, are used, 4, 8, and 12 pixels. Also, the largest value for the fraction, to the nearest tenth, that is below the upper limit for each type of edge structure that would retain image sharpness is used. Each iteration for the comparative examples is performed with the unweighted selected average algorithm. In the case of the invention examples, each iteration, except for the last, employs a weighted position sensitive, i.e. distance-related, calculation as described above. In the Appendix hereto, tables are provided showing comparative results for each invention example. In the tables, Eq 1 and 2 represent weighting operations using functions (6) and (7), respectively, as set forth below. Also, each weighting operation is demonstrated with the exponent, P, equal to 1.0 and 2.0.

$$D*(i+j)^P \qquad \text{Eq 1}$$

$$D*(i^P + j^P) \qquad \text{Eq 2}$$

In each case, the goal is to recalculate the grain spot values, x, to get as close to the background, b, as possible. The new values for the grain spot for each iteration is given in the respective tables.

EXAMPLE 1.

Figures 4, 5:
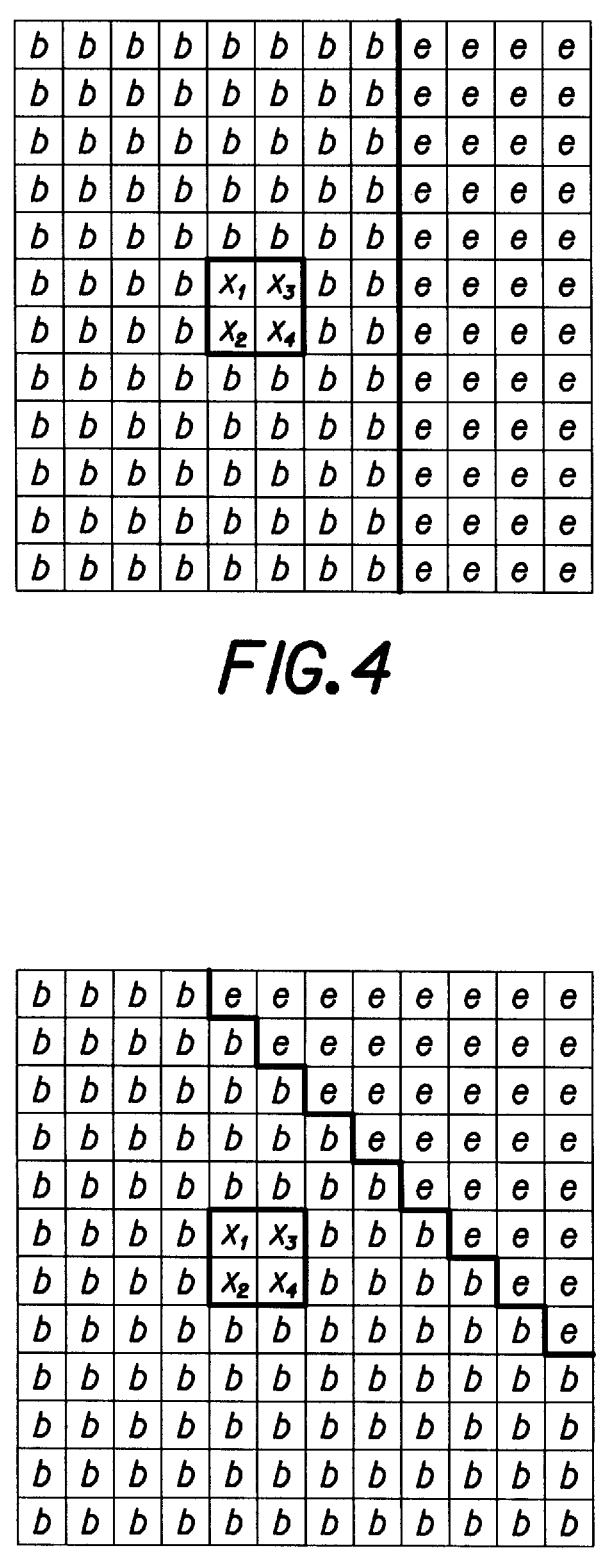

FIG. 4 shows a neighborhood array of pixels in which a grain spot and edge are represented against a background. The grain spot is represented by a 2×2 set of pixels, and the edge occurs parallel to one edge of the grain spot. There are two rows of pixels between the grain spot and the edge. The fraction value is set at 0.5.

Table 1 shows the condition in which the grain spot has a positive deviation in density relative to the background, and the edge code value is between the grain spot and background code values. The values are x=80, b=10, and e=40. The grain spot is closer in code value to the edge than the background code value. In the comparative examples, where radius was 8 and 12, the grain spot could not be brought to the value of the background, b. When the radius was 4, four iterations were required to change the grain spot code value to the background, b. Each of the invention examples changed the grain spot code value to the background, b, with between two and four iterations. Equation 1, with the exponent, P, equal to 2.0, changed the grain spot code value to the background in two iterations for all three radius values.

TABLE 1

Edge

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | | | | First Iteration | | Second Iteration | | Third Iteration | | Fourth Iteration | | Fifth Iteration | | Sixth Iteration | | Seventh Iteration | | Final non-weighted iteration | | De-grain success- |
|---|---|---|---|---|---|---|---|---|---|---|---|---|---|---|---|---|---|---|---|---|
| Eq | R | F | P | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | ful? |
| com | — | 4 | .5 | — | 23 | 30 | 11 | 25 | 10 | 16 | | | | | | | | | 10 | 16 | yes |
| inv | 1,2 | | | 1.0 | 21 | 26 | 11 | 14 | | | | | | | | | | | 10 | 10 | yes |
| inv | 1 | | | 2.0 | 19 | 23 | | | | | | | | | | | | | 10 | 10 | yes |
| inv | 2 | | | 2.0 | 19 | 23 | | | | | | | | | | | | | 10 | 10 | yes |
| com | — | 8 | .5 | — | 29 | 33 | 28 | 31 | 28 | 31 | 28 | 31 | 28 | 31 | 28 | 31 | 28 | 31 | 28 | 31 | no |
| inv | 1,2 | | | 1.0 | 25 | 27 | 15 | 22 | | | | | | | | | | | 10 | 10 | yes |
| inv | 1 | | | 2.0 | 21 | 23 | | | | | | | | | | | | | 10 | 10 | yes |
| inv | 2 | | | 2.0 | 21 | 24 | | | | | | | | | | | | | 10 | 10 | yes |
| com | — | 12 | .5 | — | 32 | 34 | 31 | 34 | 31 | 34 | 31 | 34 | 31 | 34 | 31 | 34 | 31 | 34 | 31 | 34 | no |
| inv | 1,2 | | | 1.0 | 26 | 28 | 19 | 25 | 11 | 19 | | | | | | | | | 10 | 10 | yes |
| inv | 1 | | | 2.0 | 22 | 24 | | | | | | | | | | | | | 10 | 10 | yes |
| inv | 2 | | | 2.0 | 23 | 25 | 16 | 20 | | | | | | | | | | | 10 | 10 | yes |

Table 2 shows the condition in which the grain spot has a negative deviation in density relative to the background, and the edge code value is between the grain spot and background code values. The values are x=10, b=80, and e=40. The grain spot is closer in code value to the edge than the background code value. In the comparative examples, where radius was 8 and 12, the grain spot could not be brought to the value of the background, b. When the radius was 4, five iterations were required to change the grain spot code value to the background, b. Each of the invention examples except one changed the grain spot code value to the background, b, with between two and five iterations. Equation 1 with the exponent, P, equal to 2.0 changed the grain spot code value to the background in two iterations for radius equal to 8.

the background code value. In the comparative examples, where radius was 8 and 12, the grain spot could not be brought to the value of the background, b. When the radius was 4, four iterations were required to change the grain spot code value to the background, b. Each of the invention

TABLE 2

Edge

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | | | | First Iteration | | Second Iteration | | Third Iteration | | Fourth Iteration | | Fifth Iteration | | Sixth Iteration | | Seventh Iteration | | Final non-weighted iteration | | De-grain sucess- |
|---|---|---|---|---|---|---|---|---|---|---|---|---|---|---|---|---|---|---|---|---|
| | Eq | R | F | P | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | ful? |
| com | — | 4 | .5 | — | 64 | 55 | 77 | 59 | 80 | 60 | 80 | 71 | | | | | | | 80 | 80 | yes |
| inv | 1,2 | | | 1.0 | 64 | 57 | 78 | 68 | | | | | | | | | | | 80 | 80 | yes |
| inv | 1 | | | 2.0 | 68 | 61 | 78 | 75 | | | | | | | | | | | 80 | 80 | yes |
| inv | 2 | | | 2.0 | 68 | 61 | 78 | 75 | | | | | | | | | | | 80 | 80 | yes |
| com | — | 8 | .5 | — | 54 | 49 | 55 | 50 | 55 | 50 | 55 | 50 | 55 | 50 | 55 | 50 | 55 | 50 | 55 | 50 | no |
| inv | 1,2 | | | 1.0 | 56 | 52 | 66 | 53 | 78 | 56 | 79 | 62 | | | | | | | 80 | 80 | yes |
| inv | 1 | | | 2.0 | 65 | 61 | | | | | | | | | | | | | 80 | 80 | yes |
| inv | 2 | | | 2.0 | 61 | 59 | 72 | 68 | | | | | | | | | | | 80 | 80 | yes |
| com | — | 12 | .5 | — | 50 | 47 | 50 | 47 | 50 | 47 | 50 | 47 | 50 | 47 | 50 | 47 | 50 | 47 | 50 | 47 | no |
| inv | 1,2 | | | 1.0 | 54 | 52 | 58 | 52 | 65 | 53 | 76 | 53 | 80 | 53 | 80 | 53 | 80 | 53 | 80 | 53 | partial |
| inv | 1 | | | 2.0 | 61 | 58 | 69 | 64 | | | | | | | | | | | 80 | 80 | yes |
| inv | 2 | | | 2.0 | 59 | 56 | 67 | 62 | | | | | | | | | | | 80 | 80 | yes |

Table 3 shows the condition in which the grain spot has a negative deviation in density relative to the background, and the edge code value is less than both the grain spot and background code values. The values are x=40, b=80, and e=10. The grain spot is closer in code value to the edge than examples changed the grain spot code value to the background, b, with either two and three iterations. Equation 1 with the exponent, P, equal to 2.0 changed the grain spot code value to the background in two iterations for all three radius values.

TABLE 3

Edge

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | | | | First Iteration | | Second Iteration | | Third Iteration | | Fourth Iteration | | Fifth Iteration | | Sixth Iteration | | Seventh Iteration | | Final non-weighted iteration | | De-grain sucess- |
|---|---|---|---|---|---|---|---|---|---|---|---|---|---|---|---|---|---|---|---|---|
| | Eq | R | F | P | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | ful? |
| com | — | 4 | .5 | — | 60 | 44 | 77 | 45 | 79 | 64 | | | | | | | | | 80 | 80 | yes |
| inv | 1,2 | | | 1.0 | 70 | 62 | 78 | 78 | | | | | | | | | | | 80 | 80 | yes |
| inv | 1 | | | 2.0 | 74 | 69 | | | | | | | | | | | | | 80 | 80 | yes |
| inv | 2 | | | 2.0 | 70 | 65 | 78 | 78 | | | | | | | | | | | 80 | 80 | yes |
| com | — | 8 | .5 | — | 37 | 29 | 37 | 29 | 37 | 29 | 37 | 29 | 37 | 29 | 37 | 29 | 37 | 29 | 37 | 29 | no |
| inv | 1,2 | | | 1.0 | 57 | 51 | | | | | | | | | | | | | 80 | 80 | yes |
| inv | 1 | | | 2.0 | 61 | 55 | | | | | | | | | | | | | 80 | 80 | yes |
| inv | 2 | | | 2.0 | 60 | 54 | | | | | | | | | | | | | 80 | 80 | yes |
| com | — | 12 | .5 | — | 29 | 23 | 28 | 23 | 28 | 23 | 28 | 23 | 28 | 23 | 28 | 23 | 28 | 23 | 28 | 23 | no |
| inv | 1,2 | | | 1.0 | 53 | 48 | | | | | | | | | | | | | 80 | 80 | yes |
| inv | 1 | | | 2.0 | 57 | 52 | | | | | | | | | | | | | 80 | 80 | yes |
| inv | 2 | | | 2.0 | 55 | 51 | | | | | | | | | | | | | 80 | 80 | yes |

Tables 4–6 show the cases where the grain spot is closer in code value to the background than the edge code value. The results demonstrate that the degraining performance for the invention examples is equal to that for the comparative examples. Therefore, no deleterious effects occur in using the invention versus the unweighted selected average algorithm in those cases where the selected average algorithm performs well.

TABLE 4

| | | | | | Edge | |
|---|---|---|---|---|---|---|
| Original code values | | Variables | | Values | grainspot closer to edge than background? | |
| grainspot | | $x_1, x_2, x_3, x_4$ | | 80 | no | |
| background | | b | | 40 | | |
| edge | | e | | 10 | | |

| | | | | First Iteration | | Second Iteration | | Third Iteration | | Fourth Iteration | | Fifth Iteration | | Sixth Iteration | | Seventh Iteration | | Final non-weighted iteration | | De-grain sucess- |
|---|---|---|---|---|---|---|---|---|---|---|---|---|---|---|---|---|---|---|---|---|
| Eq | R | F | P | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | ful? |
| com | — | 4 | .5 | — | 44 | 44 | | | | | | | | | | | | | 40 | 40 | yes |
| inv | 1,2 | | 1.0 | 44 | 44 | | | | | | | | | | | | | 40 | 40 | yes |
| inv | 1 | | 2.0 | 44 | 43 | | | | | | | | | | | | | 40 | 40 | yes |
| inv | 2 | | 2.0 | 44 | 44 | | | | | | | | | | | | | 40 | 40 | yes |
| com | — | 8 | .5 | — | 41 | 41 | | | | | | | | | | | | | 40 | 40 | yes |
| inv | 1,2 | | 1.0 | 40 | 40 | | | | | | | | | | | | | 40 | 40 | yes |
| inv | 1 | | 2.0 | 39 | 37 | | | | | | | | | | | | | 40 | 40 | yes |
| inv | 2 | | 2.0 | 38 | 36 | | | | | | | | | | | | | 40 | 40 | yes |
| com | — | 12 | .5 | — | 40 | 40 | | | | | | | | | | | | | 40 | 40 | yes |
| inv | 1,2 | | 1.0 | 38 | 37 | | | | | | | | | | | | | 40 | 40 | yes |
| inv | 1 | | 2.0 | 35 | 34 | | | | | | | | | | | | | 40 | 40 | yes |
| inv | 2 | | 2.0 | 35 | 33 | | | | | | | | | | | | | 40 | 40 | yes |

TABLE 5

| | | | | | Edge | |
|---|---|---|---|---|---|---|
| Original code values | | Variables | | Values | grainspot closer to edge than background? | |
| grainspot | | $x_1, x_2, x_3, x_4$ | | 80 | no | |
| background | | b | | 40 | | |
| edge | | e | | 10 | | |

| | | | | First Iteration | | Second Iteration | | Third Iteration | | Fourth Iteration | | Fifth Iteration | | Sixth Iteration | | Seventh Iteration | | Final non-weighted iteration | | De-grain sucess- |
|---|---|---|---|---|---|---|---|---|---|---|---|---|---|---|---|---|---|---|---|---|
| Eq | R | F | P | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | ful? |
| com | — | 4 | .5 | — | 37 | 37 | | | | | | | | | | | | | 40 | 40 | yes |
| inv | 1,2 | | 1.0 | 37 | 37 | | | | | | | | | | | | | 40 | 40 | yes |
| inv | 1 | | 2.0 | 37 | 38 | | | | | | | | | | | | | 40 | 40 | yes |
| inv | 2 | | 2.0 | 37 | 37 | | | | | | | | | | | | | 40 | 40 | yes |
| com | — | 8 | .5 | — | 40 | 40 | | | | | | | | | | | | | 40 | 40 | yes |
| inv | 1,2 | | 1.0 | 40 | 40 | | | | | | | | | | | | | 40 | 40 | yes |
| inv | 1 | | 2.0 | 40 | 43 | | | | | | | | | | | | | 40 | 40 | yes |
| inv | 2 | | 2.0 | 40 | 43 | | | | | | | | | | | | | 40 | 40 | yes |
| com | — | 12 | .5 | — | 40 | 40 | | | | | | | | | | | | | 40 | 40 | yes |
| inv | 1,2 | | 1.0 | 40 | 40 | | | | | | | | | | | | | 40 | 40 | yes |
| inv | 1 | | 2.0 | 44 | 45 | | | | | | | | | | | | | 40 | 40 | yes |
| inv | 2 | | 2.0 | 44 | 46 | | | | | | | | | | | | | 40 | 40 | yes |

TABLE 6

Edge

| Original code values | Variables | Values | grainspot closer to edge than background? |
|---|---|---|---|
| grainspot | $x_1, x_2, x_3, x_4$ | 80 | no |
| background | b | 40 | |
| edge | e | 10 | |

| | | | | First Iteration | | Second Iteration | | Third Iteration | | Fourth Iteration | | Fifth Iteration | | Sixth Iteration | | Seventh Iteration | | Final non-weighted iteration | | De-grain sucessful? |
|---|---|---|---|---|---|---|---|---|---|---|---|---|---|---|---|---|---|---|---|---|
| Eq | R | F | P | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | |
| com | — | 4 | .5 | — | 13 | 13 | | | | | | | | | | | | | 10 | 10 | yes |
| inv | 1,2 | | | 1.0 | 13 | 14 | | | | | | | | | | | | | 10 | 10 | yes |
| inv | 1 | | | 2.0 | 13 | 18 | | | | | | | | | | | | | 10 | 10 | yes |
| inv | 2 | | | 2.0 | 13 | 14 | | | | | | | | | | | | | 10 | 10 | yes |
| com | — | 8 | .5 | — | 10 | 10 | | | | | | | | | | | | | 10 | 10 | yes |
| inv | 1,2 | | | 1.0 | 15 | 18 | | | | | | | | | | | | | 10 | 10 | yes |
| inv | 1 | | | 2.0 | 18 | 22 | | | | | | | | | | | | | 10 | 10 | yes |
| inv | 2 | | | 2.0 | 20 | 25 | | | | | | | | | | | | | 10 | 10 | yes |
| com | — | 12 | .5 | — | 10 | 10 | | | | | | | | | | | | | 10 | 10 | yes |
| inv | 1,2 | | | 1.0 | 21 | 24 | | | | | | | | | | | | | 10 | 10 | yes |
| inv | 1 | | | 2.0 | 24 | 28 | | | | | | | | | | | | | 10 | 10 | yes |
| inv | 2 | | | 2.0 | 25 | 29 | | | | | | | | | | | | | 10 | 10 | yes |

EXAMPLE 2

FIG. 5 shows a neighborhood array of pixels similar to FIG. 4 except that the edge occurs diagonally to the grain spot. There is one pixel between the grain spot and the edge at their closest point. The fraction value was 0.5.

Table 7 shows the condition where the grain spot has a positive deviation in density relative to the background, and the edge code value is between the grain spot and background code values. The values are x=80, b=10, and e=40. The grain spot is closer in code value to the edge than the background code value. In the comparative examples, where radius was 8 and 12, the grain spot could not be brought to the value of the background, b. When the radius was 4, three iterations were required to change the grain spot code value to the background, b. Each of the invention examples changed the grain spot code value to the background, b, with between two and four iterations. Equations 1 and 2 with the exponent, P, equal to 2.0 changed the grain spot code value to the background in two iterations for all radius values equal to 4 and 8.

TABLE 7

Diagonal

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | | | | First Iteration | | | Second Iteration | | | Third Iteration | | | Fourth Iteration | | | Final non-weighted iteration | | | De-grain successful? |
|---|---|---|---|---|---|---|---|---|---|---|---|---|---|---|---|---|---|---|---|
| Eq | R | F | P | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | successful? |
| com | — | 4 | 5 | — | 24 | 21 | 28 | 11 | 11 | 22 | | | | | | | 10 | 10 | 10 | yes |
| inv | 1,2 | | | 1.0 | 23 | 20 | 27 | 11 | 11 | 18 | | | | | | | 10 | 10 | 10 | yes |
| inv | 1 | | | 2.0 | 20 | 17 | 23 | | | | | | | | | | 10 | 10 | 10 | yes |
| inv | 2 | | | 2.0 | 20 | 19 | 23 | | | | | | | | | | 10 | 10 | 10 | yes |
| com | — | 8 | 5 | — | 28 | 25 | 30 | 26 | 22 | 29 | 26 | 10 | 29 | 26 | 10 | 29 | 26 | 10 | 29 | partial |
| inv | 1,2 | | | 1.0 | 26 | 23 | 28 | 20 | 11 | 24 | | | | | | | 10 | 10 | 10 | yes |
| inv | 1 | | | 2.0 | 23 | 21 | 24 | | | | | | | | | | 10 | 10 | 10 | yes |
| inv | 2 | | | 2.0 | 22 | 20 | 24 | | | | | | | | | | 10 | 10 | 10 | yes |
| com | — | 12 | .5 | — | 31 | 29 | 33 | 30 | 28 | 32 | 30 | 28 | 32 | 30 | 28 | 32 | 30 | 28 | 32 | partial |
| inv | 1,2 | | | 1.0 | 28 | 26 | 28 | 25 | 20 | 26 | 19 | 11 | 22 | | | | 10 | 10 | 10 | yes |
| inv | 1 | | | 2.0 | 24 | 22 | 25 | 19 | 15 | 21 | | | | | | | 10 | 10 | 10 | yes |
| inv | 2 | | | 2.0 | 24 | 20 | 25 | 18 | 15 | 20 | | | | | | | 10 | 10 | 10 | yes |

Table 8 shows the condition where the grain spot has a negative deviation in density relative to the background, and the edge code value is between the grain spot and background code values. The values are x=10, b=80, and e=40.

The grain spot is closer in code value to the edge than the background code value. In the comparative examples, where radius was 8 and 12, the grain spot could not be brought to the value of the background, b. When the radius was 4, three iterations were required to change the grain spot code value to the background, b. Each of the invention examples changed the grain spot code value to the background, b, with between three and seven iterations. Equations 1 and 2 with the exponent, P, equal to 2.0 changed the grain spot code value to the background in three iterations for all radius values.

the edge code value is less than both the grain spot and background code values. The values are x=40, b=80, and e=10. The grain spot is closer in code value to the edge than the background code value. In the comparative examples, where radius was 8 and 12, the grain spot could not be brought to the value of the background, b. When the radius was 4, three iterations were required to change the grain spot code value to the background, b. Each of the invention examples changed the grain spot code value to the background, b, with either two and three iterations. Equations 1 and 2 with the exponent, P, equal to 2.0 changed the

TABLE 8

Diagonal

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | | | | First Iteration | | | Second Iteration | | | Third Iteration | | | Fourth Iteration | | | Final non-weighted iteration | | | De-grain sucessful? |
|---|---|---|---|---|---|---|---|---|---|---|---|---|---|---|---|---|---|---|---|
| | Eq | R | F | P | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | sucessful? |
| com | — | 4 | .5 | — | 63 | 67 | 58 | 78 | 78 | 63 | | | | | | | 80 | 80 | 80 | yes |
| inv | 1,2 | | | 1.0 | 63 | 67 | 58 | 78 | 78 | 73 | | | | | | | 80 | 80 | 80 | yes |
| inv | 1 | | | 2.0 | 66 | 70 | 61 | 78 | 78 | 74 | | | | | | | 80 | 80 | 80 | yes |
| inv | 2 | | | 2.0 | 66 | 70 | 61 | 78 | 78 | 75 | | | | | | | 80 | 80 | 80 | yes |
| com | — | 8 | .5 | — | 56 | 59 | 52 | 56 | 60 | 54 | 57 | 62 | 54 | 57 | 80 | 54 | 57 | 80 | 54 | partial |
| inv | 1,2 | | | 1.0 | 57 | 59 | 53 | 64 | 72 | 56 | 75 | 79 | 61 | | | | 80 | 80 | 80 | yes |
| inv | 1 | | | 2.0 | 62 | 65 | 59 | 70 | 77 | 67 | | | | | | | 80 | 80 | 80 | yes |
| inv | 2 | | | 2.0 | 60 | 63 | 58 | 71 | 75 | 66 | | | | | | | 80 | 80 | 80 | yes |
| com | — | 12 | .5 | — | 52 | 54 | 49 | 52 | 55 | 50 | 52 | 55 | 50 | 52 | 55 | 50 | 52 | 55 | 50 | no |
| inv | 1,2 | | | 1.0 | 53 | 55 | 52 | 55 | 60 | 52 | 58 | 68 | 52 | 63* | 78* | 52* | 80 | 80 | 80 | yes |
| inv | 1 | | | 2.0 | 59 | 60 | 57 | 66 | 68 | 62 | | | | | | | 80 | 80 | 80 | yes |
| inv | 2 | | | 2.0 | 58 | 60 | 56 | 65 | 69 | 62 | | | | | | | 80 | 80 | 80 | yes |

*Fifth iteration: $x_{1,4}$ = 71, $x_2$ = 79, $x_3$ = 52 and Sixth iteration: $x_{1,4}$ = 79, $x_2$= 79, $x_3$ = 79

Table 9 shows the condition where the grain spot has a negative deviation in density relative to the background, and grain spot code value to the background in two iterations for all three radius values.

TABLE 9

Diagonal

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | | | | First Iteration | | | Second Iteration | | | Third Iteration | | | Fourth Iteration | | | Final non-weighted iteration | | | De-grain sucessful? |
|---|---|---|---|---|---|---|---|---|---|---|---|---|---|---|---|---|---|---|---|
| | Eq | R | F | P | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | sucessful? |
| com | — | 4 | .5 | — | 58 | 65 | 49 | 77 | 78 | 77 | | | | | | | 80 | 80 | 80 | yes |
| inv | 1,2 | | | 1.0 | 69 | 76 | 60 | 78 | 79 | 78 | | | | | | | 80 | 80 | 80 | yes |
| inv | 1 | | | 2.0 | 76 | 76 | 67 | | | | | | | | | | 80 | 80 | 80 | yes |
| inv | 2 | | | 2.0 | 70 | 76 | 65 | | | | | | | | | | 80 | 80 | 80 | yes |
| com | — | 8 | .5 | — | 40 | 46 | 34 | 40 | 78 | 34 | 4 | 79 | 34 | 41 | 79 | 34 | 41 | 79 | 34 | no |
| inv | 1,2 | | | 1.0 | 52 | 57 | 49 | 72 | 79 | 64 | | | | | | | 80 | 80 | 80 | yes |
| inv | 1 | | | 2.0 | 56 | 61 | 52 | | | | | | | | | | 80 | 80 | 80 | yes |
| inv | 2 | | | 2.0 | 57 | 62 | 53 | | | | | | | | | | 80 | 80 | 80 | yes |
| com | — | 12 | .5 | — | 32 | 36 | 27 | 32 | 36 | 27 | 32 | 36 | 27 | 32 | 36 | 27 | 32 | 36 | 27 | no |

TABLE 9-continued

| | | | | | | | Diagonal | | | | | | |
|---|---|---|---|---|---|---|---|---|---|---|---|---|---|
| inv | 1,2 | 1.0 | 48 | 51 | 45 | 63 | 71 | 54 | | 80 | 80 | 80 | yes |
| inv | 1 | 2.0 | 52 | 55 | 49 | | | | | 80 | 80 | 80 | yes |
| inv | 2 | 2.0 | 53 | 56 | 50 | | | | | 80 | 80 | 80 | yes |

Tables 10–12 show the cases where the grain spot is closer in code value to the background than the edge code value. The results demonstrate that the degraining performance for the invention examples is equal to that for the comparative examples. Therefore, no deleterious effects occur in using the invention versus the selected average algorithm in those cases where the selected average algorithm performs well.

Table 10 shows the condition where the grain spot has a positive deviation in density relative to the background, and the edge code value is less than both the grain spot and background code values. The values are x=80, b=40, and e=10.

Table 11 shows the condition where the grain spot has a negative deviation in density relative to the background, and the edge code value is greater than both the grain spot and background code values. The values are x=10, b=40, and e=80.

Table 12 shows the condition where the grain spot has a positive deviation in density relative to the background, and the edge code value is greater than both the grain spot and background code values. The values are x=40, b=10, and e=80.

TABLE 10

| | | | | Diagonal | | | | | | | | | | | | | | | |
|---|---|---|---|---|---|---|---|---|---|---|---|---|---|---|---|---|---|---|---|
| Original code values | | Variables | | Values | grainspot closer to edge than background? | | | | | | | | | | | | | | |
| grain spot | | $x_1, x_2, x_3, x_4$ | | 80 | no | | | | | | | | | | | | | | |
| background | | b | | 40 | | | | | | | | | | | | | | | |
| edge | | e | | 10 | | | | | | | | | | | | | | | |

| | | | | | First Iteration | | | Second Iteration | | | Third Iteration | | | Fourth Iteration | | | Final non-weighted iteration | | | De-grain |
|---|---|---|---|---|---|---|---|---|---|---|---|---|---|---|---|---|---|---|---|---|
| | Eq | R | F | P | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | sucessful? |
| com | — | 4 | .5 | — | 44 | 44 | 44 | | | | | | | | | | 40 | 40 | 40 | yes |
| inv | 1,2 | | | 1.0 | 44 | 44 | 44 | | | | | | | | | | 40 | 40 | 40 | yes |
| inv | 1 | | | 2.0 | 44 | 44 | 44 | | | | | | | | | | 40 | 40 | 40 | yes |
| inv | 2 | | | 2.0 | 44 | 44 | 44 | | | | | | | | | | 40 | 40 | 40 | yes |
| com | — | 8 | .5 | — | 41 | 41 | 41 | | | | | | | | | | 40 | 40 | 40 | yes |
| inv | 1,2 | | | 1.0 | 39 | 41 | 38 | | | | | | | | | | 40 | 40 | 40 | yes |
| inv | 1 | | | 2.0 | 38 | 39 | 36 | | | | | | | | | | 40 | 40 | 40 | yes |
| inv | 2 | | | 2.0 | 37 | 39 | 37 | | | | | | | | | | 40 | 40 | 40 | yes |
| com | — | 12 | .5 | — | 40 | 40 | 40 | | | | | | | | | | 40 | 40 | 40 | yes |
| inv | 1,2 | | | 1.0 | 37 | 38 | 36 | | | | | | | | | | 40 | 40 | 40 | yes |
| inv | 1 | | | 2.0 | 34 | 35 | 33 | | | | | | | | | | 40 | 40 | 40 | yes |
| inv | 2 | | | 2.0 | 35 | 36 | 33 | | | | | | | | | | 40 | 40 | 40 | yes |

TABLE 11

| | | | | Diagonal | | | | | | | | | | | | | | | |
|---|---|---|---|---|---|---|---|---|---|---|---|---|---|---|---|---|---|---|---|
| Original code values | | Variables | | Values | grainspot closer to edge than background? | | | | | | | | | | | | | | |
| grain spot | | $x_1, x_2, x_3, x_4$ | | 80 | no | | | | | | | | | | | | | | |
| background | | b | | 40 | | | | | | | | | | | | | | | |
| edge | | e | | 10 | | | | | | | | | | | | | | | |

| | | | | | First Iteration | | | Second Iteration | | | Third Iteration | | | Fourth Iteration | | | Final non-weighted iteration | | | De-grain |
|---|---|---|---|---|---|---|---|---|---|---|---|---|---|---|---|---|---|---|---|---|
| | Eq | R | F | P | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | sucessful? |
| com | — | 4 | .5 | — | 37 | 37 | 37 | | | | | | | | | | 40 | 40 | 40 | yes |
| inv | 1,2 | | | 1.0 | 37 | 37 | 37 | | | | | | | | | | 40 | 40 | 40 | yes |
| inv | 1 | | | 2.0 | 37 | 37 | 37 | | | | | | | | | | 40 | 40 | 40 | yes |
| inv | 2 | | | 2.0 | 37 | 37 | 37 | | | | | | | | | | 40 | 40 | 40 | yes |

TABLE 11-continued

| | | | | | Diagonal | | | | | | | |
|---|---|---|---|---|---|---|---|---|---|---|---|---|
| com | — | 8 | .5 | — | 40 | 40 | 40 | | 40 | 40 | 40 | yes |
| inv | 1,2 | | 1.0 | 40 | 40 | 40 | | | 40 | 40 | 40 | yes |
| inv | 1 | | 2.0 | 42 | 40 | 44 | | | 40 | 40 | 40 | yes |
| inv | 2 | | 2.0 | 41 | 40 | 43 | | | 40 | 40 | 40 | yes |
| com | — | 12 | .5 | — | 40 | 40 | 40 | | 40 | 40 | 40 | yes |
| inv | 1,2 | | 1.0 | 41 | 40 | 42 | | | 40 | 40 | 40 | yes |
| inv | 1 | | 2.0 | 45 | 44 | 46 | | | 40 | 40 | 40 | yes |
| inv | 2 | | 2.0 | 45 | 43 | 46 | | | 40 | 40 | 40 | yes |

TABLE 12

Diagonal

| Original code values | Variables | Values | grainspot closer to edge than background? |
|---|---|---|---|
| grain spot | $x_1, x_2, x_3, x_4$ | 80 | no |
| background | b | 40 | |
| edge | e | 10 | |

| | | | | | First Iteration | | | Second Iteration | | | Third Iteration | | | Fourth Iteration | | | Final non-weighted iteration | | | De-grain |
|---|---|---|---|---|---|---|---|---|---|---|---|---|---|---|---|---|---|---|---|---|
| | Eq | R | F | P | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | sucessful? |
| com | — | 4 | .5 | — | 13 | 13 | 13 | | | | | | | | | | 10 | 10 | 10 | yes |
| inv | 1,2 | | | 1.0 | 3 | 13 | 13 | | | | | | | | | | 10 | 10 | 10 | yes |
| inv | 1 | | | 2.0 | 13 | 13 | 20 | | | | | | | | | | 10 | 10 | 10 | yes |
| inv | 2 | | | 2.0 | 13 | 13 | 14 | | | | | | | | | | 10 | 10 | 10 | yes |
| com | — | 8 | .5 | — | 10 | 10 | 10 | | | | | | | | | | 10 | 10 | 10 | yes |
| inv | 1,2 | | | 1.0 | 17 | 14 | 21 | | | | | | | | | | 10 | 10 | 10 | yes |
| inv | 1 | | | 2.0 | 22 | 18 | 25 | | | | | | | | | | 10 | 10 | 10 | yes |
| inv | 2 | | | 2.0 | 22 | 18 | 25 | | | | | | | | | | 10 | 10 | 10 | yes |
| com | — | 12 | .5 | — | 10 | 10 | 10 | | | | | | | | | | 10 | 10 | 10 | yes |
| inv | 1,2 | | | 1.0 | 24 | 22 | 26 | | | | | | | | | | 10 | 10 | 10 | yes |
| inv | 1 | | | 2.0 | 28 | 25 | 31 | | | | | | | | | | 10 | 10 | 10 | yes |
| inv | 2 | | | 2.0 | 26 | 23 | 29 | | | | | | | | | | 10 | 10 | 10 | yes |

EXAMPLE 3

Figures 6, 7:
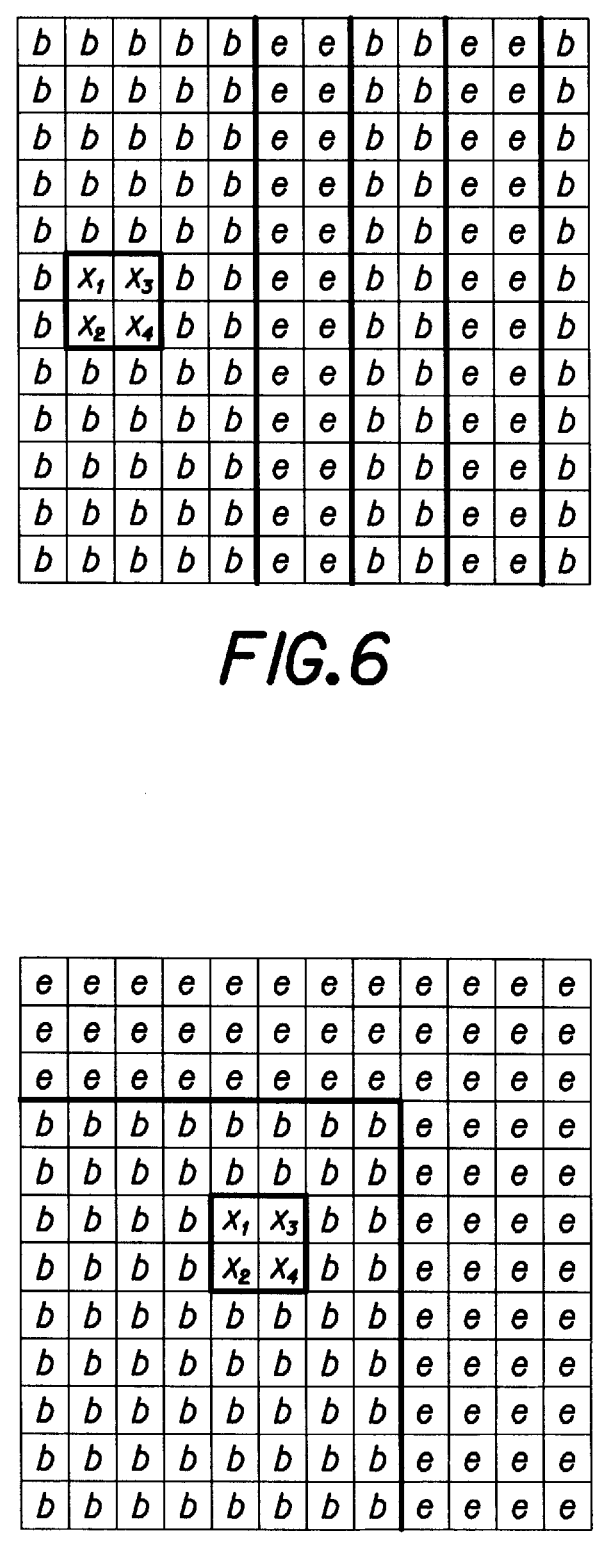

FIG. 6 shows an array of pixels where a grain spot and grid edge are represented against a background. The grain spot is represented by a 2×2 set of pixels, and the grid edge occurs parallel to one side of the grain spot. The grid consists of alternating sets of 2 rows of edge pixels and two rows of background pixels. There are two rows of pixels between the grain spot and the grid edge. The fraction value was 0.2.

Table 13 shows the condition where the grain spot has a positive deviation in density relative to the background, and the edge code value is between the grain spot and background code values. The values are x=80, b=10, and e=40. The grain spot is closer in code value to the edge than the background code value. In the comparative examples, the grain spot could not be brought to the value of the background, b for any of the radius values. Each of the invention examples changed the grain spot code value to the background, b, with between two and seven iterations. Equation 1 with the exponent, P, equal to 2.0 changed the grain spot code value to the background in two iterations for all radius values equal to 8 and 12.

TABLE 13

Grid

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | Eq | R | F | P | First Iteration | | Second Iteration | | Third Iteration | | Fourth Iteration | | Fifth Iteration | | Sixth Iteration | | Seventh Iteration | | Final non-weighted iteration | | De-grain sucess-ful? |
|---|---|---|---|---|---|---|---|---|---|---|---|---|---|---|---|---|---|---|---|---|---|
| | | | | | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | |
| com | — | 4 | .2 | — | 44 | 50 | 36 | 41 | 34 | 40 | 33 | 40 | 33 | 40 | 33 | 40 | 33 | 40 | 33 | 40 | no |
| inv | 1,2 | | | 1.0 | 33 | 33 | 25 | 34 | 14 | 33 | 10 | 32 | 10 | 27 | 10 | 14 | | | 10 | 10 | yes |
| inv | 1 | | | 2.0 | 27 | 29 | 14 | 16 | | | | | | | | | | | 10 | 10 | yes |
| inv | 2 | | | 2.0 | 27 | 27 | 14 | 14 | | | | | | | | | | | 10 | 10 | yes |
| com | — | 8 | .2 | — | 41 | 42 | 39 | 40 | 38 | 40 | 38 | 40 | 38 | 40 | 38 | 40 | 38 | 40 | 38 | 40 | no |
| inv | 1,2 | | | 1.0 | 23 | 25 | 10 | 15 | | | | | | | | | | | 10 | 10 | yes |
| inv | 1 | | | 2.0 | 19 | 21 | | | | | | | | | | | | | 10 | 10 | yes |
| inv | 2 | | | 2.0 | 20 | 23 | 10 | 13 | | | | | | | | | | | 10 | 10 | yes |
| com | — | 12 | .2 | — | 41 | 41 | 40 | 40 | 40 | 40 | 40 | 40 | 40 | 40 | 40 | 40 | 40 | 40 | 40 | 40 | no |
| inv | 1,2 | | | 1.0 | 23 | 24 | 10 | 13 | | | | | | | | | | | 10 | 10 | yes |
| inv | 1 | | | 2.0 | 18 | 19 | | | | | | | | | | | | | 10 | 10 | yes |
| inv | 2 | | | 2.0 | 18 | 20 | 10 | 13 | | | | | | | | | | | 10 | 10 | yes |

Table 14 shows the condition where the grain spot has a negative deviation in density relative to the background, and the edge code value is between the grain spot and background code values. The values are x=10, b=80, and e=40. between two and four iterations. Equations 1 and 2 with the exponent, P, equal to 2.0 changed the grain spot code value to the background in two iterations for radius values equal to 8 and 12.

TABLE 14

Grid

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | Eq | R | F | P | First Iteration | | Second Iteration | | Third Iteration | | Fourth Iteration | | Fifth Iteration | | Sixth Iteration | | Seventh Iteration | | Final non-weighted iteration | | De-grain sucess-ful? |
|---|---|---|---|---|---|---|---|---|---|---|---|---|---|---|---|---|---|---|---|---|---|
| | | | | | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | |
| com | — | 4 | .2 | — | 40 | 32 | 46 | 39 | | | | | | | | | | | 48 | 39 | no |
| inv | 1,2 | | | 1.0 | 55 | 52 | 70 | 63 | 76 | 76 | | | | | | | | | 80 | 80 | yes |
| inv | 1 | | | 2.0 | 60 | 55 | 74 | 71 | 78 | 78 | | | | | | | | | 80 | 80 | yes |
| inv | 2 | | | 2.0 | 62 | 55 | 74 | 74 | 78 | 78 | | | | | | | | | 80 | 80 | yes |
| com | — | 8 | 2 | — | 39 | 37 | 41 | 39 | 41 | 39 | 41 | 39 | 41 | 39 | 41 | 39 | 41 | 39 | 41 | 39 | no |
| inv | 1,2 | | | 1.0 | 58 | 52 | 72 | 55 | 78 | 64 | | | | | | | | | 80 | 80 | yes |
| inv | 1 | | | 2.0 | 66 | 63 | 78 | 76 | | | | | | | | | | | 80 | 80 | yes |
| inv | 2 | | | 2.0 | 66 | 63 | 78 | 75 | | | | | | | | | | | 80 | 80 | yes |
| com | — | 12 | .2 | — | 40 | 40 | 40 | 40 | 40 | 40 | 40 | 40 | 40 | 40 | 40 | 40 | 40 | 40 | 40 | 40 | no |
| inv | 1,2 | | | 1.0 | 57 | 54 | 71 | 62 | | | | | | | | | | | 80 | 80 | yes |
| inv | 1 | | | 2.0 | 67 | 64 | | | | | | | | | | | | | 80 | 80 | yes |
| inv | 2 | | | 2.0 | 65 | 63 | | | | | | | | | | | | | 80 | 80 | yes |

The grain spot is closer in code value to the edge than the background code value. In the comparative examples, where radius was 8 and 12, the grain spot could not be brought to the value of the background, b. When the radius was 4, three iterations were required to change the grain spot code value to the background, b. Each of the invention examples changed the grain spot code value to the background, b, with Table 15 shows the condition where the grain spot has a negative deviation in density relative to the background, and the edge code value is less than both the grain spot and background code values. The values are x=40, b=80, and e=10. The grain spot is closer in code value to the edge than the background code value. In the comparative examples, the grain spot could not be brought to the value of the background, b. Each of the invention examples changed the grain spot code value to the background, b, with either two or three iterations. Equations 1 and 2 with the exponent, P, equal to 2.0 changed the grain spot code value to the background in two iterations for all three radius values.

the edge code value is less than both the grain spot and background code values. The values are x=80, b=40, and e=10.

Table 17 shows the condition where the grain spot has a negative deviation in density relative to the background, and

TABLE 15

Grid

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | Eq | R | F | P | First Iteration | | Second Iteration | | Third Iteration | | Fourth Iteration | | Fifth Iteration | | Sixth Iteration | | Seventh Iteration | | Final non-weighted iteration | | Degrain success-ful? |
|---|---|---|---|---|---|---|---|---|---|---|---|---|---|---|---|---|---|---|---|---|---|
| | | | | | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | |
| com | — | 4 | .2 | — | 30 | 17 | 26 | 10 | 25 | 10 | 25 | 10 | 25 | 10 | 25 | 10 | 25 | 10 | 25 | 10 | no |
| inv | 1,2 | | | 1.0 | 70 | 65 | 76 | 76 | | | | | | | | | | | 80 | 80 | yes |
| inv | 1 | | | 2.0 | 70 | 65 | 76 | 76 | | | | | | | | | | | 80 | 80 | yes |
| inv | 2 | | | 2.0 | 70 | 70 | 77 | 77 | | | | | | | | | | | 80 | 80 | yes |
| com | — | 8 | .2 | — | 14 | 12 | 12 | 10 | 12 | 10 | 12 | 10 | #2 | 10 | 12 | 10 | 12 | 10 | 12 | 10 | no |
| inv | 1,2 | | | 1.0 | 67 | 62 | 78 | 78 | | | | | | | | | | | 80 | 80 | yes |
| inv | 1 | | | 2.0 | 72 | 67 | | | | | | | | | | | | | 80 | 80 | yes |
| inv | 2 | | | 2.0 | 71 | 62 | | | | | | | | | | | | | 80 | 80 | yes |
| com | — | 12 | .2 | — | 10 | 10 | | | | | | | | | | | | | 10 | 10 | no |
| inv | 1,2 | | | 1.0 | 65 | 60 | | | | | | | | | | | | | 80 | 80 | yes |
| inv | 1 | | | 2.0 | 65 | 62 | | | | | | | | | | | | | 80 | 80 | yes |
| inv | 2 | | | 2.0 | 67 | 64 | | | | | | | | | | | | | 80 | 80 | yes |

Tables 16–18 show the cases where the grain spot is closer in code value to the background than the edge code value. The results demonstrate that the degraining performance for the invention examples is equal to that for the comparative examples. Therefore, no deleterious effects occur in using the invention versus the selected average algorithm in those cases where the selected average algorithm performs well.

Table 16 shows the condition where the grain spot has a positive deviation in density relative to the background, and the edge code value is greater than both the grain spot and background code values. The values are x=10, b=40, and e=80.

Table 18 shows the condition where the grain spot has a positive deviation in density relative to the background, and the edge code value is greater than both the grain spot and background code values. The values are x=40, b=10, and e=80.

TABLE 16

Grid

| Original code values | Variables | Values | grain spot closer to edge than background? |
|---|---|---|---|
| grain spot | $x_1, x_2, x_3, x_4$ | 80 | no |
| background | b | 40 | |
| edge | e | 10 | |

| | Eq | R | F | P | First Iteration | | Second Iteration | | Third Iteration | | Fourth Iteration | | Fifth Iteration | | Sixth Iteration | | Seventh Iteration | | Final non-weighted iteration | | Degrain success-ful? |
|---|---|---|---|---|---|---|---|---|---|---|---|---|---|---|---|---|---|---|---|---|---|
| | | | | | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | |
| com | — | 4 | .2 | — | 50 | 50 | 42 | 42 | | | | | | | | | | | 40 | 40 | yes |
| inv | 1,2 | | | 1.0 | .50 | 50 | 42 | 42 | | | | | | | | | | | 40 | 40 | yes |
| inv | 1 | | | 2.0 | 50 | 50 | 42 | 42 | | | | | | | | | | | 40 | 40 | yes |
| inv | 2 | | | 2.0 | 50 | 50 | 42 | 42 | | | | | | | | | | | 40 | 40 | yes |
| com | — | 8 | .2 | — | 42 | 42 | | | | | | | | | | | | | 40 | 40 | yes |
| inv | 1,2 | | | 1.0 | 42 | 42 | | | | | | | | | | | | | 40 | 40 | yes |
| inv | 1 | | | 2.0 | 42 | 40 | | | | | | | | | | | | | 40 | 40 | yes |

TABLE 16-continued

Grid

| | | | | | | | | | |
|---|---|---|---|---|---|---|---|---|---|
| inv | 2 | | 2.0 | 42 | 41 | 40 | 40 | yes |
| com | — | 12 | .2 | — | 41 | 41 | 40 | 40 | yes |
| inv | 1,2 | | 1.0 | 41 | 40 | 40 | 40 | yes |
| inv | 1 | | 2.0 | 39 | 38 | 40 | 40 | yes |
| inv | 2 | | 2.0 | 39 | 38 | 40 | 40 | yes |

TABLE 17

Grid

| Original code values | Variables | Values | grain spot closer to edge than background? |
|---|---|---|---|
| grain spot | $x_1, x_2, x_3, x_4$ | 80 | no |
| background | b | 40 | |
| edge | e | 10 | |

| | | | | First Iteration | | Second Iteration | | Third Iteration | | Fourth Iteration | | Fifth Iteration | | Sixth Iteration | | Seventh Iteration | | Final non-weighted iteration | | De-grain sucessful? |
|---|---|---|---|---|---|---|---|---|---|---|---|---|---|---|---|---|---|---|---|---|
| | Eq | R | F | P | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | |
| com | — | 4 | .2 | — | 32 | 32 | 38 | 38 | | | | | | | | | | | 40 | 40 | yes |
| inv | 1,2 | | | 1.0 | 32 | 32 | 38 | 38 | | | | | | | | | | | 40 | 40 | yes |
| inv | 1 | | | 2.0 | 32 | 32 | 38 | 38 | | | | | | | | | | | 40 | 40 | yes |
| inv | 2 | | | 2.0 | 32 | 32 | 38 | 38 | | | | | | | | | | | 40 | 40 | yes |
| com | — | 8 | .2 | — | 37 | 37 | | | | | | | | | | | | | 40 | 40 | yes |
| inv | 1,2 | | | 1.0 | 37 | 37 | | | | | | | | | | | | | 40 | 40 | yes |
| inv | 1 | | | 2.0 | 37 | 37 | | | | | | | | | | | | | 40 | 40 | yes |
| inv | 2 | | | 2.0 | 37 | 37 | | | | | | | | | | | | | 40 | 40 | yes |
| com | — | 12 | .2 | — | 40 | 40 | | | | | | | | | | | | | 40 | 40 | yes |
| inv | 1,2 | | | 1.0 | 40 | 40 | | | | | | | | | | | | | 40 | 40 | yes |
| inv | 1 | | | 2.0 | 40 | 40 | | | | | | | | | | | | | 40 | 40 | yes |
| inv | 2 | | | 2.0 | 40 | 42 | | | | | | | | | | | | | 40 | 40 | yes |

TABLE 18

Grid

| Original code values | Variables | Values | grain spot closer to edge than background? |
|---|---|---|---|
| grain spot | $x_1, x_2, x_3, x_4$ | 80 | no |
| background | b | 40 | |
| edge | e | 10 | |

| | | | | First Iteration | | Second Iteration | | Third Iteration | | Fourth Iteration | | Fifth Iteration | | Sixth Iteration | | Seventh Iteration | | Final non-weighted iteration | | De-grain sucessful? |
|---|---|---|---|---|---|---|---|---|---|---|---|---|---|---|---|---|---|---|---|---|
| | Eq | R | F | P | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | $x_{1,2}$ | $x_{3,4}$ | |
| com | — | 4 | .2 | — | 17 | 17 | 11 | 11 | | | | | | | | | | | 10 | 10 | yes |
| inv | 1,2 | | | 1.0 | 17 | 17 | 11 | 11 | | | | | | | | | | | 10 | 10 | yes |
| inv | 1 | | | 2.0 | 17 | 17 | 11 | 11 | | | | | | | | | | | 10 | 10 | yes |
| inv | 2 | | | 2.0 | 17 | 17 | 11 | 11 | | | | | | | | | | | 10 | 10 | yes |
| com | — | 8 | .2 | — | 12 | 12 | | | | | | | | | | | | | 10 | 10 | yes |
| inv | 1,2 | | | 1.0 | 12 | 17 | | | | | | | | | | | | | 10 | 10 | yes |
| inv | 1 | | | 2.0 | 13 | 17 | | | | | | | | | | | | | 10 | 10 | yes |
| inv | 2 | | | 2.0 | 12 | 18 | | | | | | | | | | | | | 10 | 10 | yes |
| com | — | 12 | .2 | — | 10 | 10 | | | | | | | | | | | | | 10 | 10 | yes |
| inv | 1,2 | | | 1.0 | 14 | 17 | | | | | | | | | | | | | 10 | 10 | yes |
| inv | 1 | | | 2.0 | 15 | 17 | | | | | | | | | | | | | 10 | 10 | yes |
| inv | 2 | | | 2.0 | 17 | 19 | | | | | | | | | | | | | 10 | 10 | yes |

EXAMPLE 4

FIG. 7 shows an array of pixels where a grain spot and corner edge are represented against a background. The grain spot is represented by a 2×2 set of pixels, and the corner edge occurs parallel to two sides of the grain spot. There are two rows of pixels between the grain spot and the corner edge along both sides of the corner. The fraction value was 0.2.

Table 19 shows the condition where the grain spot has a positive deviation in density relative to the background, and the edge code value is between the grain spot and background code values. The values are x=80, b=10, and e=40. The grain spot is closer in code value to the edge than the background code value. In the comparative examples, the grain spot could not be brought to the value of the background, b for any of the radius values. The invention examples with the exponent, P, equal to 2.0 changed the grain spot code value to the background, b, with between three and five iterations. Equations 1 and 2 with the exponent, P, equal to 2.0 changed the grain spot code value to the background in three iterations for radius values equal to 4 and 8.

Table 20 shows the condition where the grain spot has a negative deviation in density relative to the background, and the edge code value is between the grain spot and background code values. The values are x=10, b=80, and e=40. The grain spot is closer in code value to the edge than the background code value. In the comparative examples, the grain spot could not be brought to the value of the background, b. The invention examples with the exponent, P, equal to 2.0 changed the grain spot code value to the background, b, with between three and eight iterations. Equations 1 and 2 with the exponent, P, equal to 2.0 changed the grain spot code value to the background in three iterations for radius values equal to 8.

TABLE 19

Corner

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | Eq | R | F | P | First Iteration $x_{1,4}$ | $x_2$ | $x_3$ | Second Iteration $x_{1,4}$ | $x_2$ | $x_3$ | Third Iteration $x_{1,4}$ | $x_2$ | $x_3$ | Fourth Iteration $x_{1,4}$ | $x_2$ | $x_3$ | Final non-weighted iteration $x_{1,4}$ | $x_2$ | $x_3$ | De-grain sucessful? |
|---|---|---|---|---|---|---|---|---|---|---|---|---|---|---|---|---|---|---|---|---|
| com | — | 4 | .2 | — | 50 | 50 | 50 | 42 | 42 | 42 | 40 | 40 | 40 | 40 | 40 | 40 | 40 | 40 | 40 | no |
| inv | 1,2 | | | 1.0 | 33 | 33 | 33 | 34 | 34 | 34 | 34 | 34 | 34 | 34 | 34 | 34 | 34 | 34 | 34 | no |
| inv | 1 | | | 2.0 | 29 | 27 | 31 | 16 | 14 | 20 | | | | | | | 10 | 10 | 10 | yes |
| inv | 2 | | | 2.0 | 27 | 27 | 27 | 14 | 14 | 14 | | | | | | | 10 | 10 | 10 | yes |
| com | — | 8 | .2 | — | 42 | 42 | 42 | 40 | 40 | 40 | 40 | 40 | 40 | 40 | 40 | 40 | 40 | 40 | 40 | no |
| inv | 1,2 | | | 1.0 | 32 | 29 | 32 | 34 | 20 | 34 | 28 | 11 | 38 | 23 | 10 | 39 | 13 | 10 | 39 | partial |
| inv | 1 | | | 2.0 | 25 | 24 | 27 | #7 | 13 | 20 | | | | | | | 10 | 10 | 10 | yes |
| inv | 2 | | | 2.0 | 23 | 21 | 27 | 13 | 10 | 22 | | | | | | | 10 | 10 | 10 | yes |
| com | — | 12 | .2 | — | 41 | 41 | 41 | 40 | 40 | 40 | 40 | 40 | 40 | 40 | 40 | 40 | 40 | 40 | 40 | no |
| inv | 1,2 | | | 1.0 | 30 | 29 | 31 | 32 | 27 | 32 | 34 | 24 | 35 | 37 | 18 | 37 | 40 | 10 | 40 | partial |
| inv | 1 | | | 2.0 | 27 | 26 | 29 | 24 | 21 | 27 | 20 | 14 | 26 | 16 | 10 | 24 | 10 | 10 | 10 | yes |
| inv | 2 | | | 2.0 | 27 | 25 | 29 | 23 | 20 | 27 | 20 | 15 | 25 | 17 | 10 | 24 | 16 | 10 | 10 | yes |

TABLE 20

Corner

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | | | | First Iteration | | | Second Iteration | | | Third Iteration | | | Fourth Iteration | | | Final non-weighted iteration | | | De-grain |
|---|---|---|---|---|---|---|---|---|---|---|---|---|---|---|---|---|---|---|---|
| | Eq | R | F | P | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | sucessful? |
| com | — | 4 | .2 | — | 32 | 32 | 32 | 38 | 38 | 38 | 40 | 40 | 40 | 40 | 40 | 40 | 40 | 40 | 40 | no |
| inv | 1,2 | | | 1.0 | 50 | 55 | 42 | 47 | 64 | 41 | 47 | 72 | 40 | 47 | 79 | 40 | 40 | 80 | 40 | partial |
| inv | 1 | | | 2.0 | 55 | 57 | 55 | 71 | 73 | 68 | 77 | 77 | 77 | | | | 80 | 80 | 80 | yes |
| inv | 2 | | | 2.0 | 55 | 62 | 55 | 74 | 74 | 74 | 78 | 78 | 78 | | | | 80 | 80 | 80 | yes |
| com | — | 8 | .2 | — | 37 | 37 | 37 | 39 | 39 | 39 | 40 | 40 | 40 | 40 | 40 | 40 | 40 | 40 | 40 | no |
| inv | 1,2 | | | 1.0 | 49 | 52 | 46 | 46 | 55 | 42 | 41 | 65 | 40 | 40 | 77 | 40 | 40 | 80 | 40 | partial |
| inv | 1 | | | 2.0 | 57 | 62 | 53 | 69 | 75 | 61 | | | | | | | 80 | 80 | 80 | yes |
| inv | 2 | | | 2.0 | 58 | 61 | 56 | 67 | 77 | 63 | | | | | | | 80 | 80 | 80 | yes |
| com | — | 12 | .2 | — | 40 | 40 | 40 | 40 | 40 | 40 | 40 | 40 | 40 | 40 | 40 | 40 | 40 | 40 | 40 | no |
| inv | 1,2 | | | 1.0 | 49 | 50 | 48 | 46 | 47 | 43 | 40 | 43 | 40 | 40 | 40 | 40 | no | | | |
| inv | 1 | | | 2.0 | 53 | 55 | 51 | 58 | 60 | 52 | 62 | 65 | 53 | 66* | 73* | 56* | 80 | 80 | 80 | yes |
| inv | 2 | | | 2.0 | 54 | 56 | 52 | 58 | 62 | 53 | 61 | 68 | 54 | 64# | 74# | 56# | 80 | 80 | 80 | yes |

*Fifth iteration: $x_{1,4} = 71$, $x_2 = 78$, $x_3 = 58$, Sixth iteration: $x_{1,4} = 75$, $x_2 = 79$, $x_3 = 60$, Seventh iteration: : $x_{1,4} = 78$, $x_2 = 79$, $x_3 = 61$
Fifth iteration: $x_{1,4} = 68$, $x_2 = 79$, $x_3 = 58$, Sixth iteration: $x_{1,4} = 71$, $x_2 = 79$, $x_3 = 59$, Seventh iteration: $x_{1,4} = 75$, $x_2 = 79$, $x_3 = 61$ Table 21 shows the condition where the grain spot has a negative deviation in density relative to the background, and the edge code value is less than both the grain spot and background code values. The values are x=40, b=80, and between three and six iterations. Equations 1 and 2 with the exponent, P, equal to 2.0 changed the grain spot code value to the background in three iterations for radius values equal to 4 and 8.

TABLE 21

Corner

| Original code values | Variables | Values | grain spot closer to edge than background? |
|---|---|---|---|
| grain spot | $x_1, x_2, x_3, x_4$ | 80 | yes |
| background | b | 10 | |
| edge | e | 40 | |

| | | | | First Iteration | | | Second Iteration | | | Third Iteration | | | Fourth Iteration | | | Final non-weighted iteration | | | De-grain |
|---|---|---|---|---|---|---|---|---|---|---|---|---|---|---|---|---|---|---|---|
| | Eq | R | F | P | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | sucessful? |
| com | — | 4 | .2 | — | 17 | 47 | 17 | 41 | 11 | 11 | 10 | 10 | 10 | 10 | 10 | 10 | 10 | 10 | 10 | no |
| inv | 1,2 | | | 1.0 | 58 | 65 | 56 | 74 | 74 | 74 | | | | | | | 80 | 80 | 80 | yes |
| inv | 1 | | | 2.0 | 65 | 70 | 61 | 76 | 76 | 76 | | | | | | | 80 | 80 | 80 | yes |
| inv | 2 | | | 2.0 | 70 | 70 | 70 | 77 | 77 | 77 | | | | | | | 80 | 80 | 80 | yes |
| com | — | 8 | .2 | — | 12 | 12 | 12 | 10 | 10 | 10 | 10 | 10 | 10 | 10 | 10 | 10 | 10 | 10 | 10 | no |
| inv | 1,2 | | | 1.0 | 51 | 55 | 47 | 71 | 77 | 60 | | | | | | | 80 | 80 | 80 | yes |
| inv | 1 | | | 2.0 | 61 | *67 | 55 | 77 | 78 | 68 | | | | | | | 80 | 80 | 80 | yes |
| inv | 2 | | | 2.0 | 56 | 64 | 50 | 72 | 78 | 64 | | | | | | | 80 | 80 | 80 | yes |
| com | — | 12 | .2 | — | 10 | 10 | 10 | 10 | 10 | 10 | no | | | | | | | | | |
| inv | 1,2 | | | 1.0 | 42 | 46 | 38 | 46 | 60 | 33 | 56 | 77 | 27 | 71* | 79* | 22* | 80 | 80 | 10 | partial |
| inv | 1 | | | 2.0 | 46 | 51 | 41 | 56 | 62 | 45 | 65 | 74 | 46 | 72# | 79# | 53# | 80 | 80 | 80 | yes |
| inv | 2 | | | 2.0 | 45 | 50 | 41 | 51 | 61 | 43 | 56 | 73 | 44 | 63 | 79 | 46 | 80 | 80 | 80 | yes |

* Fifth iteration: $x_{1,4} = 79$, $x_2 = 79$, $x_3 = 16$
Fifth iteration: $x_{1,4} = 79$, $x_2 = 79$, $x_3 = 53$ e=10. The grain spot is closer in code value to the edge than the background code value. In the comparative examples, the grain spot could not be brought to the value of the background, b. Each of the invention examples, except one, changed the grain spot code value to the background, b, with Tables 22–24 show the cases where the grain spot is closer in code value to the background than the edge code value. The results demonstrate that the degraining performance for the invention examples is equal to that for the comparative examples. Therefore, no deleterious effects occur in using the invention versus the selected average algorithm in those cases where the selected average algorithm performs well.

Table 22 shows the condition where the grain spot has a positive deviation in density relative to the background, and the edge code value is less than both the grain spot and background code values. The values are x=80, b=40, and e=10.

Table 23 shows the condition where the grain spot has a negative deviation in density relative to the background, and the edge code value is greater than both the grain spot and background code values. The values are x=10, b=40, and e=80.

Table 24 shows the condition where the grain spot has a positive deviation in density relative to the background, and the edge code value is greater than both the grain spot and background code values. The values are x=40, b=10, and e=80.

TABLE 22

Original

| Original code values | Variables | Values | grain spot closer to edge than background? |
|---|---|---|---|
| grain spot | $x_1, x_2, x_3, x_4$ | 80 | no |
| background | b | 40 | |
| edge | e | 10 | |

| | | | | First Iteration | | | Second Iteration | | | Third Iteration | | | Fourth Iteration | | | Final non-weighted iteration | | | De-grain |
|---|---|---|---|---|---|---|---|---|---|---|---|---|---|---|---|---|---|---|---|
| | EQ | R | F | P | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | sucessful? |
| com | — | 4 | .2 | — | 50 | 50 | 50 | 42 | 42 | 42 | | | | | | | 40 | 40 | 40 | yes |
| inv | 1,2 | | | 1.0 | 50 | 50 | 50 | 42 | 42 | 42 | | | | | | | 40 | 40 | 40 | yes |
| inv | 1 | | | 2.0 | 50 | 50 | 50 | 42 | 42 | 42 | | | | | | | 40 | 40 | 40 | yes |
| inv | 2 | | | 2.0 | 50 | 50 | 50 | 42 | 42 | 42 | | | | | | | 40 | 40 | 40 | yes |
| com | — | 8 | .2 | — | 42 | 42 | 42 | | | | | | | | | | 40 | 40 | 40 | yes |
| inv | 1,2 | | | 1.0 | 42 | 42 | 41 | | | | | | | | | | 40 | 40 | 40 | yes |
| inv | 1 | | | 2.0 | 40 | 41 | 38 | | | | | | | | | | 40 | 40 | 40 | yes |
| inv | 2 | | | 2.0 | 40 | 42 | 37 | | | | | | | | | | 40 | 40 | 40 | yes |
| com | — | 12 | .2 | — | 42 | 42 | 42 | | | | | | | | | | 40 | 40 | 40 | yes |
| inv | 1,2 | | | 1.0 | 38 | 39 | 36 | | | | | | | | | | 40 | 40 | 40 | yes |
| inv | 1 | | | 2.0 | 35 | 36 | 33 | | | | | | | | | | 40 | 40 | 40 | yes |
| inv | 2 | | | 2.0 | 33 | 35 | 31 | | | | | | | | | | 40 | 40 | 40 | yes |

TABLE 23

Original

| Original code values | Variables | Values | grain spot closer to edge than background? |
|---|---|---|---|
| grain spot | $x_1, x_2, x_3, x_4$ | 80 | no |
| background | b | 40 | |
| edge | e | 10 | |

| | | | | First Iteration | | | Second Iteration | | | Third Iteration | | | Fourth Iteration | | | Final non-weighted iteration | | | De-grain |
|---|---|---|---|---|---|---|---|---|---|---|---|---|---|---|---|---|---|---|---|
| | E | R | F | P | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | sucessful? |
| com | — | 4 | .2 | — | 32 | 32 | 32 | 38 | 38 | 38 | | | | | | | 40 | 40 | 40 | yes |
| inv | 1,2 | | | 1.0 | 32 | 32 | 32 | 38 | 38 | 38 | | | | | | | 40 | 40 | 40 | yes |
| inv | 1 | | | 2.0 | 32 | 32 | 32 | 38 | 38 | 38 | | | | | | | 40 | 40 | 40 | yes |
| inv | 2 | | | 2.0 | 32 | 32 | 32 | 38 | 38 | 38 | | | | | | | 40 | 40 | 40 | yes |
| com | — | 8 | .2 | — | 37 | 37 | 37 | | | | | | | | | | 40 | 40 | 40 | yes |
| inv | 1,2 | | | 1.0 | 37 | 37 | 38 | | | | | | | | | | 40 | 40 | 40 | yes |
| inv | 1 | | | 2.0 | 38 | 37 | 40 | | | | | | | | | | 40 | 40 | 40 | yes |
| inv | 2 | | | 2.0 | 40 | 37 | 42 | | | | | | | | | | 40 | 40 | 40 | yes |
| com | — | 12 | .2 | — | 40 | 40 | 40 | | | | | | | | | | 40 | 40 | 40 | yes |
| inv | 1,2 | | | 1.0 | 40 | 39 | 41 | | | | | | | | | | 40 | 40 | 40 | yes |
| inv | 1 | | | 2.0 | 46 | 43 | 48 | | | | | | | | | | 40 | 40 | 40 | yes |
| inv | 2 | | | 2.0 | 47 | 43 | 50 | | | | | | | | | | 40 | 40 | 40 | yes |

TABLE 24

Original

| Original code values | Variables | Values | grain spot closer to edge than background? |
|---|---|---|---|
| grain spot | $x_1, x_2, x_3, x_4$ | 80 | no |
| background | b | 40 | |
| edge | e | 10 | |

| | | | | First Iteration | | | Second Iteration | | | Third Iteration | | | Fourth Iteration | | | Final non-weighted iteration | | | De-grain |
|---|---|---|---|---|---|---|---|---|---|---|---|---|---|---|---|---|---|---|---|
| | Eq | R | F | P | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | $x_{1,4}$ | $x_2$ | $x_3$ | sucessful? |
| com | — | 4 | .2 | — | 17 | 17 | 17 | | | | | | | | | | 10 | 10 | 10 | yes |
| inv | 1,2 | | | 1.0 | 17 | 17 | 17 | | | | | | | | | | 10 | 10 | 10 | yes |
| inv | 1 | | | 2.0 | 17 | 17 | 17 | | | | | | | | | | 10 | 10 | 10 | yes |
| inv | 2 | | | 2.0 | 17 | 17 | 17 | | | | | | | | | | 10 | 10 | 10 | yes |
| com | — | 8 | .2 | — | 12 | 12 | 12 | | | | | | | | | | 10 | 10 | 10 | yes |
| inv | 1,2 | | | 1.0 | 18 | 14 | 21 | | | | | | | | | | 10 | 10 | 10 | yes |
| inv | 1 | | | 2.0 | 23 | 17 | 29 | | | | | | | | | | 10 | 10 | 10 | yes |
| inv | 2 | | | 2.0 | 18 | 12 | 25 | | | | | | | | | | 10 | 10 | 10 | yes |
| com | — | 12 | .2 | — | 10 | 10 | 10 | | | | | | | | | | 10 | 10 | 10 | yes |
| inv | 1,2 | | | 1.0 | 24 | 21 | 28 | | | | | | | | | | 10 | 10 | 10 | yes |
| inv | 1 | | | 2.0 | 32 | 27 | 36 | | | | | | | | | | 10 | 10 | 10 | yes |
| inv | 2 | | | 2.0 | 33 | 28 | 38 | | | | | | | | | | 10 | 10 | 10 | yes |

The invention has been described with reference to one or more preferred embodiments. However, it will be appreciated that variations and modifications can be effected by persons of ordinary skill in the art without departing from the scope of the invention.

What is claimed is:

1. An improved method of degraining a digital image by means of a selected average technique in which code values of selected pixels, in a neighborhood of pixels surrounding a target pixel and which are rank ordered by differences in code values between the neighborhood pixels and the target pixel, are averaged to obtain an average code value and the average code value is assigned to the target pixel, wherein the improvement comprises:

weighting said difference code values as a function of distance of each neighborhood pixel from the target pixel before rank ordering said weighted difference code values,
   wherein said weighting comprises multiplying the difference code value of each neighborhood pixel by a factor which is related to distance between said target pixel and said neighborhood pixel; the factor being raised to an exponential value greater than zero.

2. The improved method of claim 1 wherein the exponential value is greater than 1.

3. The improved method of claim 2 wherein said exponential value is substantially equal to 2.

4. The improvement of claim 1 in which a distance weighted average code value is calculated and assigned for a target pixel in each of a plurality of neighborhoods in an image after which the process of calculation and assignment is iterated for all of said target pixels to establish successive recalculated code values for the target pixels.

5. The improvement of claim 4 in which said neighborhoods of pixels include background and edge pixel elements and the process is iterated until substantially all said assigned target pixel code values of said plurality of neighborhoods are closer to code values of said background pixel elements than said edge pixel elements.

6. The improvement of claim 5 in which, as a final step, average code values for said target pixels of said plurality of neighborhoods are calculated from a selected fraction of unweighted neighborhood pixel code values closest in code values to the most recent assigned target pixel code values; and said last mentioned average code values are assigned as final target pixel code values.

7. A method of digital image processing to perform a smoothing function on the image comprising the steps of:

selecting a target pixel element in the digital image;
   defining a neighborhood of pixel elements surrounding the target pixel;
   rank ordering the pixels in the neighborhood as a function of difference code values between each neighborhood pixel element and the target pixel element in order of increasing absolute difference in code values between each pixel element and the target pixel;
   weighting the difference code values of each neighborhood pixel element as a function of the distance of the neighborhood pixel element from the target pixel element;
   calculating an average code value from a predetermined fraction of the rank ordered pixel elements having smallest weighted difference code values relative to said target pixel;
   and assigning said average code value to said target pixel element.

8. The improvement of claim 7 in which a distance weighted average code value is calculated and assigned for a target pixel in each of a plurality of neighborhoods in an image after which the process of calculation and assignment is iterated for all of said target pixels to establish successive recalculated code values for the target pixels.

9. The improvement of claim 8 in which said neighborhoods of pixels include background and edge pixel elements and the process is iterated until substantially all said assigned target pixel code values of said plurality of neighborhoods are closer to code values of said background pixel elements than said edge pixel elements.

10. The improvement of claim 9 in which, as a final step, average code values for said target pixels of said plurality of neighborhoods are calculated from a selected fraction of unweighted neighborhood pixel code values closest in code values to the most recent assigned target pixel code values; and said last mentioned average code values are assigned as final target pixel code values.

* * * * *